(12) United States Patent
Okada et al.

(10) Patent No.: US 11,182,627 B2
(45) Date of Patent: Nov. 23, 2021

(54) IMAGE PROCESSING DEVICE AND IMAGE PROCESSING METHOD (71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 182 days.

(21) Appl. No.: 16/574,395

(22) Filed: Sep. 18, 2019

(65) Prior Publication Data

US 2020/0193186 A1 Jun. 18, 2020

(30) Foreign Application Priority Data

Dec. 14, 2018 (JP) .............................. JP2018-234795

(51) Int. Cl.
*G06K 9/00* (2006.01)
*G06K 9/46* (2006.01)
*G06K 9/32* (2006.01)

(52) U.S. Cl.
CPC ..... *G06K 9/00812* (2013.01); *G06K 9/00456* (2013.01); *G06K 9/00463* (2013.01); *G06K 9/3233* (2013.01); *G06K 9/4628* (2013.01); *G06K 9/4676* (2013.01)

(58) Field of Classification Search
CPC .......... G06K 9/00456; G06K 9/00463; G06K 9/00812; G06K 9/3233; G06K 9/4628; G06K 9/4676; G06T 7/12; G06T 2207/30264

USPC ......................................... 382/206, 226, 284
See application file for complete search history.

(56) References Cited

U.S. PATENT DOCUMENTS

| 9,361,529 | B2 | 6/2016 | Ryu et al. |
| 9,536,155 | B2 | 1/2017 | Takemae |
| 9,721,460 | B2 | 8/2017 | Takemura et al. |
| 10,311,731 | B1 | 6/2019 | Li et al. |
| 10,373,226 | B1 | 8/2019 | Russell et al. |
| 2002/0087253 | A1 | 7/2002 | Jeon |
| 2003/0128106 | A1 | 7/2003 | Ross |

(Continued)

FOREIGN PATENT DOCUMENTS

| CN | 203318408 U | 12/2013 |
| CN | 102834309 B | 12/2016 |

(Continued)

OTHER PUBLICATIONS

Mar. 30, 2021 Office Action issued in U.S. Appl. No. 16/574,516.

(Continued)

*Primary Examiner* — Daniel G Mariam
(74) *Attorney, Agent, or Firm* — Oliff PLC (57) ABSTRACT

An image processing device includes: a detection unit which detects partition line candidates that are candidates for a partition line for partitioning a parking frame, based on edge lines that are detected based on luminance of each pixel of image data taken by shooting a neighborhood of a vehicle; and a generation unit which generates an integrated partition line candidate by integrating the partition line candidates detected by the detection unit, according to a prescribed integration condition.

13 Claims, 10 Drawing Sheets

(56) References Cited

U.S. PATENT DOCUMENTS

| | | |
|---|---|---|
| 2003/0222983 A1 | 12/2003 | Nobori et al. |
| 2004/0254720 A1 | 12/2004 | Tanaka et al. |
| 2006/0080035 A1 | 4/2006 | Daubert et al. |
| 2008/0109120 A1 | 5/2008 | Sawamoto |
| 2009/0243889 A1 | 10/2009 | Suhr et al. |
| 2009/0278709 A1 | 11/2009 | Endo et al. |
| 2010/0049402 A1 | 2/2010 | Tanaka |
| 2010/0195901 A1 | 8/2010 | Andrus et al. |
| 2010/0318467 A1 | 12/2010 | Porter et al. |
| 2011/0006917 A1 | 1/2011 | Taniguchi et al. |
| 2013/0027557 A1 | 1/2013 | Hirai et al. |
| 2013/0266188 A1 | 10/2013 | Bulan et al. |
| 2014/0355822 A1 | 12/2014 | Choi et al. |
| 2015/0254981 A1 | 9/2015 | Tachibana et al. |
| 2015/0294163 A1 | 10/2015 | Sakamoto |
| 2015/0317526 A1 | 11/2015 | Muramatsu et al. |
| 2015/0344028 A1 | 12/2015 | Gieseke et al. |
| 2016/0039409 A1 | 2/2016 | Hayakawa et al. |
| 2016/0093214 A1 | 3/2016 | Wu et al. |
| 2016/0107689 A1 | 4/2016 | Lee |
| 2016/0272244 A1 | 9/2016 | Imai et al. |
| 2016/0304088 A1 | 10/2016 | Barth |
| 2017/0032681 A1 | 2/2017 | Tomozawa et al. |
| 2017/0085790 A1 | 3/2017 | Bohn |
| 2018/0012082 A1 | 1/2018 | Satazoda et al. |
| 2018/0095474 A1 | 4/2018 | Batur et al. |
| 2018/0099661 A1 | 4/2018 | Bae et al. |
| 2018/0162446 A1 | 6/2018 | Mikuriya et al. |
| 2018/0215413 A1 | 8/2018 | Inagaki |
| 2018/0307919 A1 | 10/2018 | Hayakawa |
| 2018/0307922 A1 | 10/2018 | Yoon et al. |
| 2018/0345955 A1 | 12/2018 | Kim et al. |
| 2019/0073902 A1 | 3/2019 | Indoh et al. |
| 2019/0075255 A1* | 3/2019 | Matsumoto ............... B60R 1/00 |
| 2019/0094871 A1 | 3/2019 | Sugano |
| 2019/0370572 A1 | 12/2019 | Nagpal et al. |
| 2020/0062242 A1 | 2/2020 | Hayakawa |
| 2020/0074192 A1 | 3/2020 | Ogata et al. |
| 2020/0104613 A1 | 4/2020 | Hirai |
| 2020/0117927 A1 | 4/2020 | Oba |
| 2020/0118310 A1 | 4/2020 | Matsumoto et al. |
| 2020/0175634 A1 | 6/2020 | Aggarwala et al. |
| 2020/0193643 A1 | 6/2020 | Hess et al. |
| 2020/0398827 A1 | 12/2020 | Hara |
| 2021/0180954 A1 | 6/2021 | Hiyokawa et al. |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015-219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 2017-0102192 A | 9/2017 |
| WO | 03/058163 A1 | 7/2003 |
| WO | 2005/081941 A2 | 9/2005 |
| WO | 2010/116922 A1 | 10/2010 |
| WO | 2014/084118 A1 | 6/2014 |
| WO | 2017/068699 A1 | 4/2017 |

OTHER PUBLICATIONS

Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
Apr. 6, 2021 Office Action issued in U.S. Appl. No. 16/574,507.
U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Sep. 29, 2020 Office Action issued in U.S. Appl. No. 16/574,391.
Sep. 2, 2020 Corrected Notice of Allowability issued in U.S. Appl. No. 16/574,546.
Nov. 12, 2020 Notice of Allowance issued in U.S. Appl. No. 16/574,598.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year 2012).
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year 2016).
K Hamada et al., "Surround View Based Parking Lot Detection and Tracking." IEEE Intelligent Vehicles Symposium. (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year 2018).
Aug. 3, 2020 Office Action issued in U.S. Appl. No. 16/574,598.
Reinhard et al., Photographic Tone Reproduction for Digital Images (2002), ACM Transactions on Graphics, 2,4, 217-236 (Year: 2002).
Feb. 2, 2021 Office Action issued in U.S. Appl. No. 16/574,422.
Jun. 30, 2020 Notice of Allowance issued in U.S. Appl. No. 16/574,546.
Jul. 20, 2021 Notice of Allowance issued in U.S. Appl. No. 16/574,507.
Jun. 24, 2021 Notice of Allowance issued in U.S. Appl. No. 16/574,499.

* cited by examiner

| PARTITION LINE ID | APEX COORDINATES | | | | LENGTH | UPDATE STATE | RELATIVE LUMINANCE |
|---|---|---|---|---|---|---|---|
| | P1 | P2 | P3 | P4 | | | |
| #1 | x1, y1 | x2, y2 | x3, y3 | x4, y4 | l1 | st1 | BRIGHT |
| #2 | x12, y12 | x22, y22 | x32, y32 | x42, y42 | l2 | st2 | DARK |
| #3 | x13, y13 | x23, y23 | x33, y33 | x43, y43 | l3 | st3 | BRIGHT |
| ... | ... | ... | ... | ... | ... | ... | ... |

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234795 filed on Dec. 14, 2018.

TECHNICAL FIELD

The present invention relates to an image processing device and an image processing method.

BACKGROUND ART

In recent years, with the development of autonomous drive techniques, image processing devices for detecting a parking frame in which to park a vehicle on the basis of image data taken by shooting a neighborhood of the vehicle have been coming into wide use. Image processing devices of this type detect partition lines of a parking frame on the basis of image data and detect the parking frame on the basis of the detected partition lines (refer to JP-A-2017-87758, for example).

SUMMARY OF INVENTION

However, in conventional techniques, a parking frame may not be detected in the case where partition lines are detected as discrete lines.

The present invention has been made in view of the above, and an object of the invention is therefore to provide an image processing device and an image processing method capable of increasing the accuracy of detection of a parking frame.

The image processing device according to the embodiment is equipped with a detection unit and a generation unit. The detection unit detects partition line candidates that are candidates for a partition line for partitioning a parking frame, on the basis of edge lines that are detected on the basis of the luminance of each pixel of image data taken by shooting a neighborhood of a vehicle. The generation unit generates an integrated partition line candidate by integrating the partition line candidates detected by the detection unit, according to prescribed integration conditions.

The invention makes it possible to increase the accuracy of detection of a parking frame.

DESCRIPTION OF EMBODIMENTS

An image processing device 1 and an image processing method according to an embodiment will be hereinafter described in detail with reference to the accompanying drawings. The present invention is not limited by the embodiment.

Figure 1A:
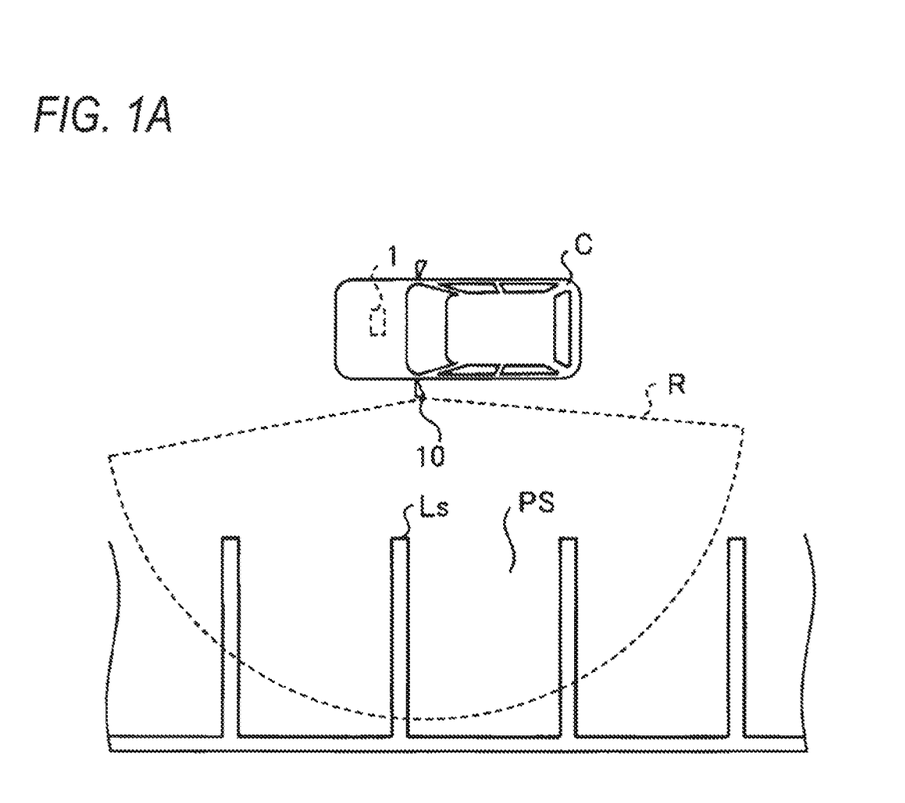
FIG. 1A shows an example manner of installation of an image processing device according to an embodiment.
Figure 1B:
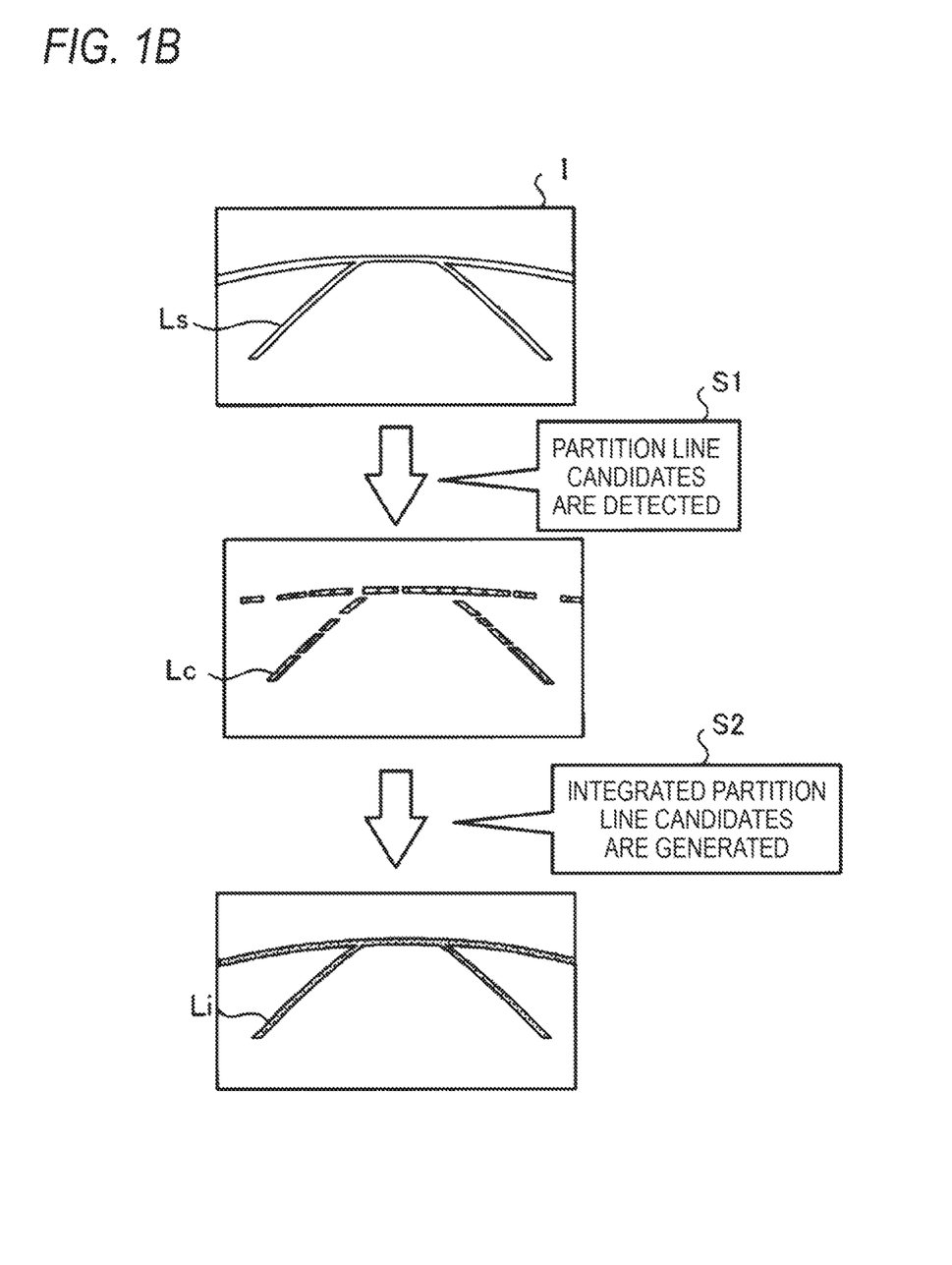
FIG. 1B outlines an image processing method according to the embodiment.

First, the image processing device 1 according to the embodiment will be outlined with reference to FIGS. 1A and 1B. FIG. 1A shows an example manner of installation of the image processing device 1 and FIG. 1B outlines the image processing method. The image processing method is performed by the image processing device 1 shown in FIG. 1A.

As shown in FIG. 1A, the image processing device 1 is installed in a vehicle C and detects a parking frame PS on the basis of image data taken by a vehicular camera 10.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

To detect a parking frame PS, the image processing device 1 detects partition line candidates Lc that are candidates for partition lines Ls that define a parking frame PS and detects the target parking frame PS on the basis of the detected partition line candidates Lc.

However, the target parking frame PS may not be detected in the case where, for example, some partition line candidate Lc is detected as a discrete line or a line that is terminated halfway.

In view of the above, in the image processing device 1 according to the embodiment, detected partition line candidates Lc are integrated together according to prescribed integration conditions. With this measure, in the image processing device 1 according to the embodiment, the accuracy of detection of a target parking frame PS can be increased.

More specifically, as shown in FIG. 1B, first, at step S1, partition line candidates Lc are detected from image data I. For example, the image processing device 1 detects each partition line candidate Lc on the basis of edge lines that are obtained by connecting edge points detected by performing edge processing on the image data I.

The image processing device 1 detects, as a partition line candidate Lc, edge lines corresponding to boundaries between a partition line and an exposed road surface. That is, each partition line candidate Lc is formed by a pair of edge lines corresponding to left and right end lines of a partition line.

Then, at step S2, the image processing device 1 generates an integrated partition line candidate Li by integrating partition line candidates Lc detected at step S1 according to prescribed integration conditions. The image processing device 1 can detect a parking frame PS on the basis of integrated partition line candidates Li.

That is, the image processing device 1 according to the embodiment can detect a partition line properly by integrating discrete partition line candidates Lc properly. As such, the image processing device 1 according to the embodiment can increase the accuracy of detection of a parking frame PS. The details of processing for generating an integrated partition line candidate Li will be described later.

The image processing device 1 according to the embodiment can integrate an integrated partition line candidate Li detected in a current frame with a partition line candidate Lc detected in a past frame or an integrated partition line candidate Li generated through integration in a past frame.

In the following description, the term "partition line candidate Lc" is defined as a generic term including an integrated partition line candidate Li, a past partition line candidate Lc, etc. A partition line candidate Lc detected in a current frame and an integrated partition line candidate Li generated by integrating such partition line candidates Lc may be referred to as an "observation partition line candidate" and a partition line candidate Lc and an integrated partition line candidate Li may be referred to as a "time-series partition line candidate."

Figure 2:
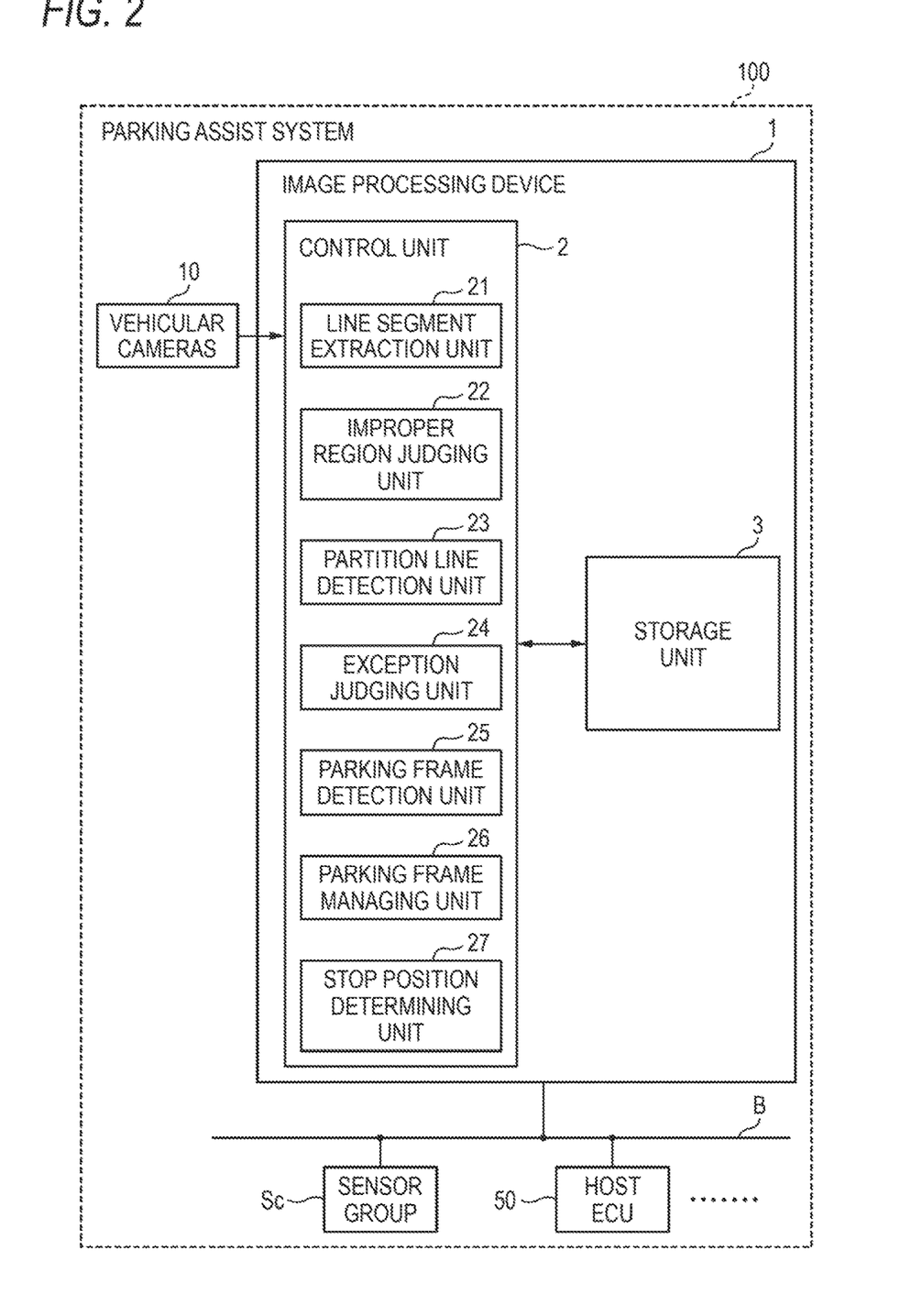
FIG. 2 is a block diagram of a parking support system including the image processing device according to the embodiment.

Next, an example configuration of the image processing device 1 according to the embodiment will be described with reference to FIG. 2. FIG. 2 is a block diagram of a parking assist system 100 including the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B which complies with the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C in a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control. The following description will be made with an assumption that the host ECU 50 parks the vehicle C in a parking frame PS by backward parking.

As shown in FIG. 2, the image processing device 1 is equipped with a control unit 2 and a storage unit 3. The control unit 2 is equipped with a line segment extraction unit 21, an improper region judging unit 22, a partition line detection unit 23, an exception judging unit 24, a parking frame detection unit 25, a parking frame managing unit 26, and a stop position determining unit 27.

For example, the control unit 2 includes a computer having a CPU (central processing unit), a ROM (read-only memory), a RAM (random access memory), an HDD (hard disk drive), an input/output port, etc., and other various kinds of circuits.

For example, the CPU of the computer functions as the line segment extraction unit 21, the improper region judging unit 22, the partition line detection unit 23, the exception judging unit 24, the parking frame detection unit 25, the parking frame managing unit 26, and the stop position determining unit 27 by reading out programs stored in the ROM and running them.

All or part of the line segment extraction unit 21, the improper region judging unit 22, the partition line detection unit 23, the exception judging unit 24, the parking frame detection unit 25, the parking frame managing unit 26, and the stop position determining unit 27 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame detection process (described later) either in the case where the vehicle C is considered to be running in a parking lot (e.g., the vehicle speed is lower than or equal to 30 km/h) or during all the period when the vehicle C is running.

The line segment extraction unit 21 detects edge lines each of which is a line connecting edge points on the basis of the luminance of each of pixels of image data that is input from a vehicular camera 10. More specifically, the line segment extraction unit 21 converts the image data received from the vehicular camera 10 into a grayscale image. Grayscaling is processing of converting the value of each pixel of image data into one of prescribed gradation levels of white to black (e.g., 256 gradation levels) according to its luminance.

Then the line segment extraction unit 21 projects the gray scale image onto a projection surface such as a road surface on the basis of a position and an angle of attachment of the vehicular camera 10 to the vehicle C. The line segment extraction unit 21 thus obtains a planar image of the gray scale image. The line segment extraction unit 21 thereafter calculates edge intensity and a luminance gradient of each pixel by, for example, applying a Sobel filter to the planar image.

Then the line segment extraction unit 21 extracts edge points by extracting pixels whose edge intensity values are larger than a prescribed value and extract edge lines by connecting adjoining edge points. The line segment extraction unit 21 communicates edge information relating to the extracted edge points and edge lines to the improper region judging unit 22.

The improper region judging unit 22 judges, on the basis of the edge points and edge lines extracted by the line segment extraction unit 21, presence/absence of an improper region where detection of a partition line to constitute a parking frame is difficult. For example, the improper region judging unit 22 determines, as an improper region, an unpaved road surface region (e.g., graveled region) and a grating region where more edge points are detected than in a paved road surface.

More specifically, the improper region judging unit 22 can judge, as an improper region, a region where the density of edge points is higher than a prescribed value or the luminance gradient of edge points is not uniform. The improper region judging unit 22 eliminates edge information of the improper region from the above-mentioned edge information on the basis of the thus-determined improper region and gives resulting information to the downstream stage.

The partition line detection unit 23 detects partition line candidates, that is, candidates for partition lines to partition a parking frame, on the basis of the edge lines extracted by the line segment extraction unit 21. More specifically, the partition line detection unit 23 detects, as a partition line candidate, edge lines that are approximately parallel with each other and whose interval is within a prescribed range corresponding to the width of partition lines.

That is, the partition line detection unit 23 detects, as a partition line candidate, edge lines to correspond to left and right end lines of a partition line in its width direction. The partition line detection unit 23 generates partition line information relating to the detected partition line candidates and communicates the generated partition line information to the exception judging unit 24.

As described above, the partition line detection unit 23 can generate an integrated partition line candidate Li by integrating detected partition line candidates Lc according to the prescribed integration conditions and manage partition line candidates Lc and integrated partition line candidates Li in time-series.

The partition line detection unit 23 can perform the processing of detecting partition line candidates in such a manner as to eliminate the improper region detected by the improper region judging unit 22. In other words, the partition line detection unit 23 does not perform the partition line candidate detection processing for the improper region. This makes it possible to reduce the processing load of the control unit 2. A specific example of the partition line detection unit 23 will be described later with reference to FIG. 3.

The exception judging unit 24 judges presence/absence of a parking prohibition region where parking of the vehicle C is not permitted, on the basis of the partition line candidates detected by the partition line detection unit 23. For example, the exception judging unit 24 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 24 can judge presence/absence of a partition line candidate(s) that is not necessary for detection of a parking frame, such as (part of) a road surface marking. For example, the exception judging unit 24 can detect a road surface marking contained in image data by matching partition line candidates detected by the partition line detection unit 23 with template models of road surface markings.

The exception judging unit 24 eliminates unnecessary partition line candidates from the partition line information, adds information indicating the parking prohibition region to the partition line information, and communicates the resulting partition line information to the parking frame detection unit 25.

The parking frame detection unit 25 detects a parking frame on the basis of the partition line candidates detected by the partition line detection unit 23. More specifically, the parking frame detection unit 25 detects, as part of a parking frame, partition line candidates that are arranged parallel with each other with a prescribed interval.

The prescribed interval is a width of a standard parking region for common or public use that is prescribed in, for example, a law relating to parking lots. At this time, the parking frame detection unit 25 detects a parking frame so as to exclude the parking prohibition region determined by the exception judging unit 24.

That is, the parking frame detection unit 25 detects a parking frame so as to exclude a zebra zone or the like. Upon detecting the parking frame, the parking frame detection unit 25 communicates parking frame information relating to the detected parking frame to the parking frame managing unit 26. In the following, the partition line candidates detected as constituting a parking frame will be referred to as "partition lines." Each piece of partition line information includes apex coordinates of each partition line with reference to the vehicle C.

The parking frame managing unit 26 manages, in time series, the partition frame information of the parking frame detected by the parking frame detection unit 25. The parking frame managing unit 26 can estimate a movement distance of the vehicle C on the basis of sensor values received from the sensor group Sc and estimate apex coordinates of current apex coordinates of each partition line on the basis of the movement distance and past partition frame information.

Furthermore, the parking frame managing unit 26 can update the coordinate information of each partition line of past partition frame information on the basis of newly received partition frame information. That is, the parking frame managing unit 26 updates the relative positional relationship between the vehicle C and the parking frame at such occasions as the vehicle C moves.

Still further, it is also possible for the parking frame managing unit 26 to set a parking frame detection range with an assumption that plural parking frames are arranged continuously. For example, the parking frame managing unit 26 assumes that plural parking frames exist continuously including one parking frame (reference parking frame) detected by the parking frame detection unit 25.

And the parking frame managing unit 26 sets the thus-assumed range of the plural parking frames as a detection range. With this measure, it suffices for the above-described line segment extraction unit 21 to perform edge line detection processing only for the detection range set by the parking frame managing unit 26, whereby the processing load of the control unit 2 can be reduced.

The stop position determining unit 27 determines a stop position of the vehicle C, that is, a parking position in the parking frame, on the basis of the edge lines detected by the line segment extraction unit 21. For example, the stop position determining unit 27 determines a stop position of the vehicle C by detecting a sprag(s) or curb, a wall, a white line extending in the vehicle width direction, etc. on the basis of the edge lines detected by the line segment extraction unit 21. That is, the stop position determining unit 27 determines a stop position on the basis of a partition line or a sprag located at deep position in the parking frame PS and extending in the width direction of the vehicle C.

When detecting a sprag, the stop position determining unit 27 determines a stop position so that the bottom portions of the rear wheels of the vehicle C will be located just in front of the sprag. When detecting a white line, a wall, or the like rather than a sprag, the stop position determining unit 27 determines a stop position so that the rear end (e.g., the end of the rear bumper) will be located just in front of it.

Figure 3:
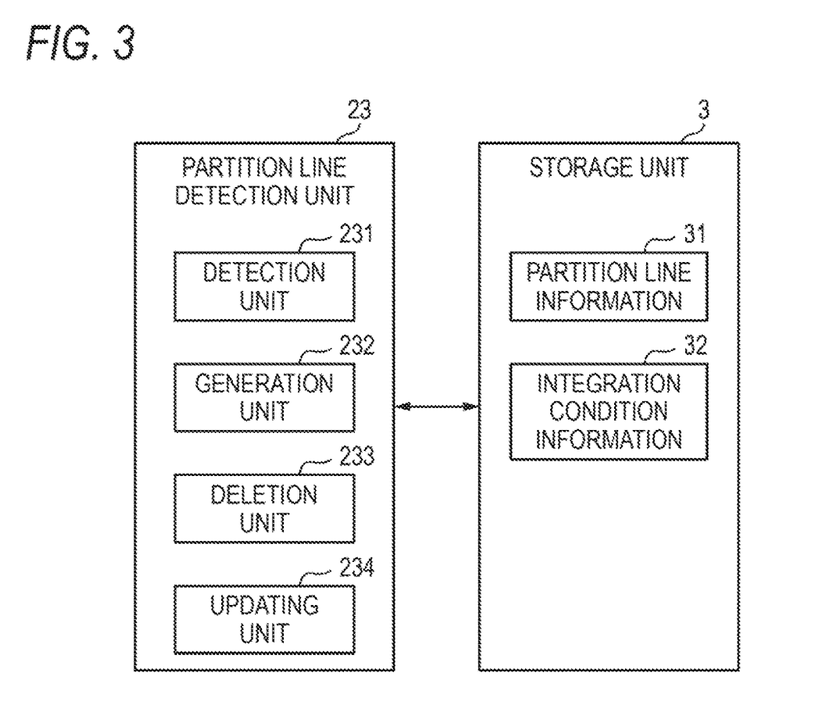
FIG. 3 is a block diagram of a partition line detection unit.

Next, an example configuration of the partition line detection unit 23 will be described with reference to FIG. 3. FIG. 3 is a block diagram of the partition line detection unit 23. As shown in FIG. 3, the partition line detection unit 23 is equipped with a detection unit 231, a generation unit 232, a deletion unit 233, and an updating unit 234. When the partition line detection unit 23 detects partition line candidates Lc, the storage unit 3 stores partition line information 31 and integration condition information 32.

Figure 4:
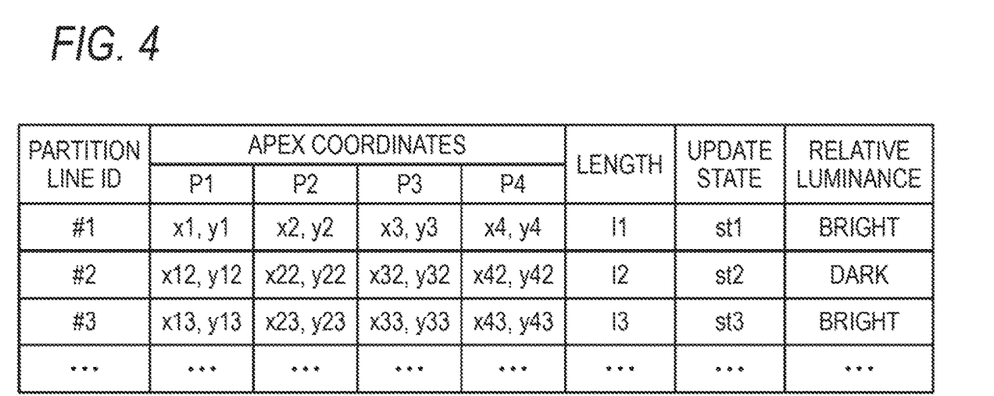
FIG. 4 shows specific examples of partition line information.

The partition line information 31 is information relating to partition line candidates Lc detected by the detection unit 231 (described later) and includes, among other kinds of information, pieces of coordinate information of the respective partition line candidates Lc. FIG. 4 shows examples of the partition line information 31.

As shown in FIG. 4, the partition line information 31 is information in which a "partition line ID," "apex coordinates," a "length," an "update state," and "relative luminance" are correlated with each other. The "partition line ID" is an identifier for identification of the partition line candidate Lc.

The "apex coordinates" are information representing coordinates of each apex of the partition line candidate Lc. For example, the "apex coordinates" are coordinates of a coordinate system having the vehicle C as a reference. Alternatively, the "apex coordinates" may be coordinates of a world coordinate system. The "length" means an overall length of the partition line candidate Lc. The "update state" means an update state of a time-series partition line candidate. Specific examples of the "update state" will be described later with reference to FIG. 5.

The "relative luminance" is relative luminance of the partition line candidate Lc with respect to its neighborhood. For example, if the luminance of the partition line candidate Lc is higher than that of its neighborhood, the "relative luminance" is "bright." If the luminance of the partition line candidate Lc is lower than that of its neighborhood, the "relative luminance" is "dark."

Figure 5:
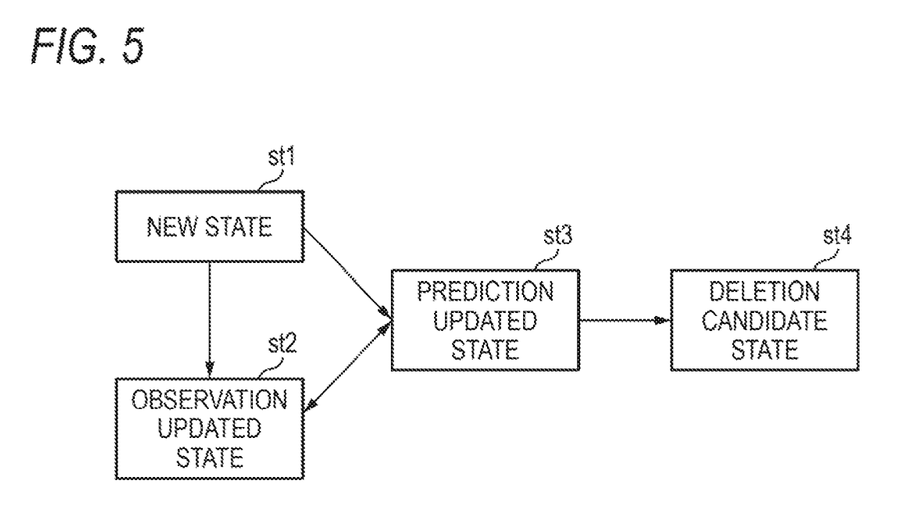
FIG. 5 shows examples of an "update state."

Next, the "update state" shown in FIG. 4 will be described with reference to FIG. 5. FIG. 5 shows examples of the "update state." As shown in FIG. 5, the "update state" is classified broadly into four states, that is, a new state st1, an observation updated state st2, a prediction updated state st3, and a deletion candidate state st4.

The new state st1 is a state of a case that an observation partition line candidate has not been integrated with any time-series partition line candidate, that is, a state that an observation partition line candidate exists independently of time-series partition line candidates. In other words, a partition line candidate Lc in the new state st1 has no temporal continuity with any other time-series partition line candidate in time series. A partition line candidate Lc in the new state st1 will make a transition to the observation updated state st2 or the prediction updated state st3.

The observation updated state st2 is a state that a time-series partition line candidate has been integrated with an observation partition line candidate. That is, the observation updated state st2 is a state that a time-series partition line candidate has been updated by an observation partition line candidate. For example, a partition line candidate Lc in the new state st1 or the prediction updated state st3 makes a transition to the observation updated state st2 when integrated with an observation partition line candidate.

The prediction updated state st3 is a state that a time-series partition line candidate has been updated on the basis of a movement distance of the vehicle C instead of having been updated by an observation partition line candidate. That is, the prediction updated state st3 is a state that a time-series partition line candidate has been updated by extrapolation processing that is based on a movement distance of the vehicle C.

A transition is made to the prediction updated state st3 if a time-series partition line candidate in the new state st1 is not integrated in the next frame processing or a time-series partition line candidate in the observation updated state st2 cannot keep its current state (observation updated state st2) in the next frame processing.

A time-series partition line candidate in the prediction updated state st3 makes a transition to the observation updated state st2 if it is integrated with another time-series partition line candidate or an observation partition line candidate by processing in plural frames. A time-series partition line candidate in the prediction updated state st3 makes a transition to the deletion candidate state st4 if it has failed to make a transition to the observation updated state st2 in plural frames.

A partition line candidate Lc in the deletion candidate state st4 is deleted from the storage unit 3 after a lapse of plural frames. That is, the deletion candidate state st4 is a state that data is held inside though it is not used for detection of a partition line.

Returning to FIG. 3, the integration condition information 32 will be described. The integration condition information 32 is information relating to conditions for integration of partition line candidates Lc. The integration conditions are conditions (1)-(6) described below:

(1) Being partition line candidates Lc detected from image data I taken by the same vehicular camera 10.

(2) Being partition line candidates Lc that are the same in relative luminance (see FIG. 4).

(3) Being partition line candidates Lc whose angular difference is smaller than or equal to a prescribed value (e.g., 10°).

(4) Being partition line candidates Lc the distance between which is shorter than or equal to a threshold value (e.g., 1,900 mm).

(5) Being partition line candidates Lc the deviation between which in the width direction is shorter than or equal to a prescribed value (e.g., 200 mm).

(6) The angle formed by a longer one of partition line candidates Lc to be integrated together and an integrated partition line candidate Li is smaller than or equal to a prescribed value (e.g., 10°).

The detection unit 231 (described later) generates an integrated partition line candidate Li by integrating partition line candidates Lc that satisfy all of the conditions (1)-(6). The integration condition information 32 includes information relating to priority order of partition line candidate Lc to be used for generating an integrated partition line candidate Li. A specific example of the priority order will be described later.

Next, the detection unit 231 will be described. The detection unit 231 detects a partition line candidate Lc that is a candidate for a partition line for partitioning a parking frame, on the basis of edge lines extracted by the line segment extraction unit 21 shown in FIG. 2. The detection unit 231 detects, as a partition line candidate Lc, a pair of edge lines that correspond to boundaries between an actual partition line and a neighboring road surface.

Assume an example case that partition line is a white line and higher in luminance than the neighboring road surface. In this case because the luminance difference between the white line and the neighboring road surface is large at their boundaries, two, approximately parallel edge lines are extracted at the left end and right end, in the width direction, of the white line. Thus, the detection unit 231 detects, as a partition line candidate Lc, a pair of edge lines that are approximately parallel with each other and are spaced from each other by a prescribed interval.

Figure 6:
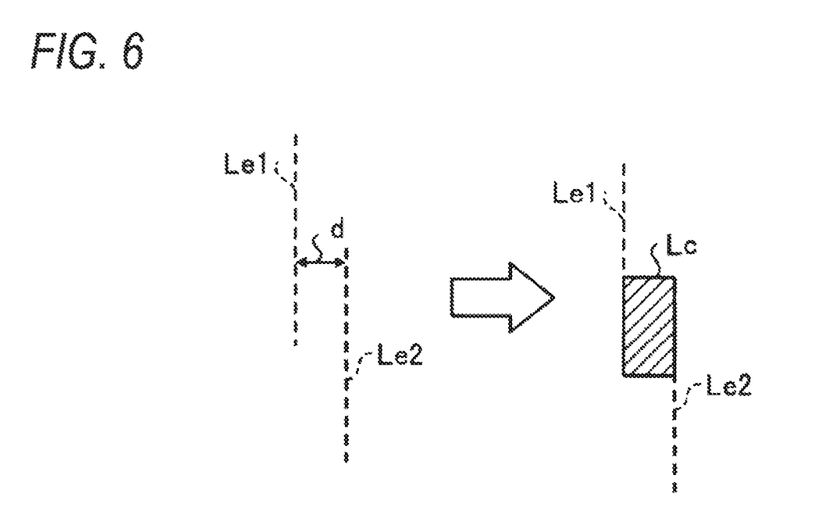
FIG. 6 shows a specific example partition line candidate.

FIG. 6 shows a specific example partition line candidate Lc. Although a case that edge lines Le1 and Le2 are straight lines will be described here, they may be curved lines.

As shown FIG. 6, the detection unit 231 detects a partition line candidate Lc from the edge lines Le1 and Le2 in a case that they are approximately parallel with each other and the distance d between them is within a prescribed range.

The prescribed range is a range that corresponds to the line width of actual partition lines and is 5 to 10 cm, for example. As shown in FIG. 6, the detection unit 231 detects, as a partition line candidate Lc, a region where the edge lines Le1 and Le2 overlap with each other and their distance d is made the width of the partition line candidate Lc.

In other words, the detection unit 231 does not detect, as a partition line candidate Lc, regions where the edge lines Le1 and Le2 do not overlap with each other. This is because as described above a partition line should be formed by a pair of edge lines Le that correspond to the left end and right end, in the width direction, of the partition line.

The regions where the edge lines Le1 and Le2 do not overlap with each other may correspond to noise. Thus, not detecting, as a partition line candidate Lc, the regions where the edge lines Le1 and Le2 do not overlap with each other makes it possible to detect only a highly reliable partition line candidate Lc, and hence to suppress erroneous detection of a parking frame.

The detection unit 231 detects a partition line candidate Lc on the basis of a detection condition relating to a luminance gradient of each edge line Le in addition to the above-mentioned edge line Le arrangement conditions. More specifically, where a partition line is a white line, it is expected that the luminance increases toward the center line of the white line. Thus, in this case, the edge lines Le1 and Le2 have opposite luminance gradients (i.e., the luminance increases toward the center line of the white line).

As a result, the detection unit 231 can increase the accuracy of detection of a partition line candidate Lc by detecting, as a partition line candidate Lc, a pair of edge lines Le having opposite luminance gradients. Another case is also expected that an actual partition line is lower in luminance than its neighborhood. Thus, a pair of edge lines Le whose luminance gradients are such that the luminance increases outward may also be detected as a partition line candidate Lc.

Returning to FIG. 3, the generation unit 232 will be described. The generation unit 232 generates an integrated partition line candidate Li by integrating partition line candidates Lc detected by the detection unit 231 according to the prescribed integration conditions.

Figure 7:
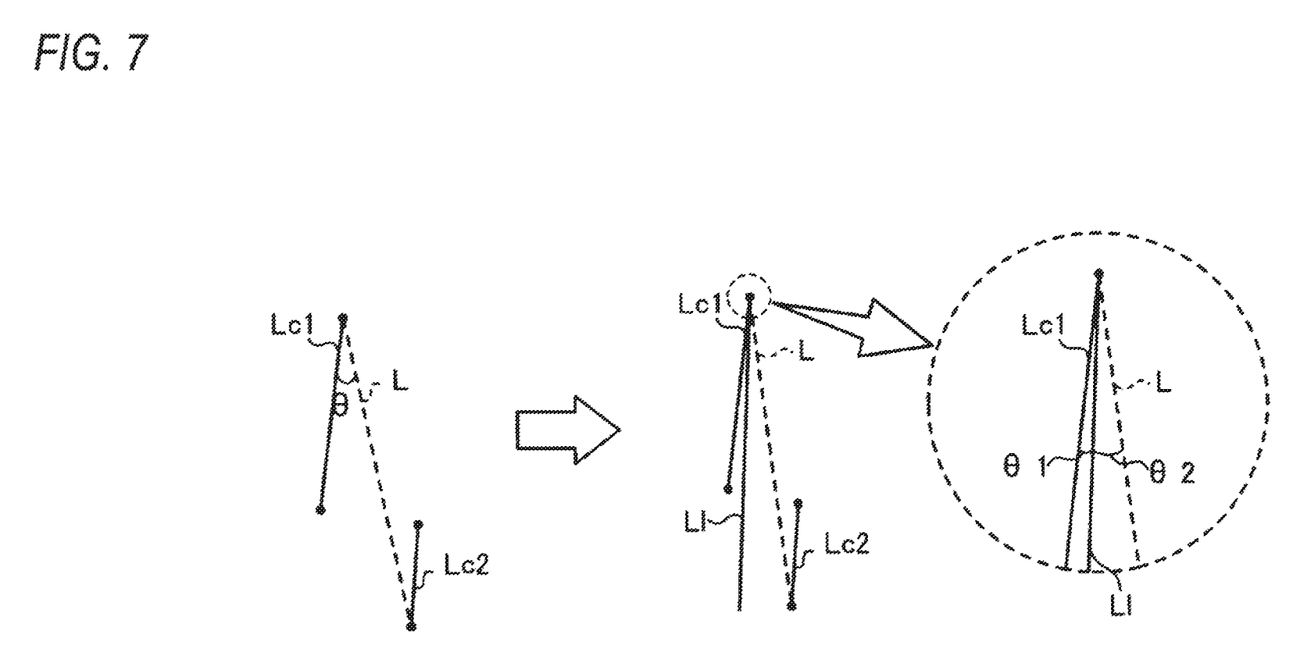
FIG. 7 shows a specific example integrated partition line candidate.

FIG. 7 shows a specific example integrated partition line candidate Li. A description will be made of a case of generating an integrated partition line candidate Li by integrating together a partition line candidate Lc1 and a partition line candidate Lc2 that is shorter than the partition line candidate Lc1. To simplify the description, it is assumed that the partition line candidates Le1 and Lc2 are straight lines.

As shown in FIG. 7, the length of a line segment L that is longer between line segments each of which connects the start point of one of the two partition line candidates Lc1 and Lc2 and the end point of the other is made the length of an integrated partition line candidate Li. In other words, the distance between two most distant end points of the two partition line candidates Lc1 and Lc2 among the end points of them is made the length of an integrated partition line candidate Li.

That is, the generation unit 232 sets the length of an integrated partition line candidate Li so that it becomes greater than the partition line candidate Lc1. Subsequently, the angle $\theta 1$ that is formed by the integrated partition line candidate Li and the longer one Lc1 of the two partition line candidates Lc1 and Lc2 is set equal to an angle obtained by dividing the angle $\theta$ formed by the line segment L and the longer partition line candidate Lc1 according to the ratio between the reciprocals of the lengths of the two partition line candidates Lc1 and Lc2.

For example, assuming that the lengths of the partition line candidates Le1 and Lc2 are $l1$ and $l2$, respectively, the angle $\theta 1$ formed by the partition line candidate Lc1 and the integrated partition line candidate Li is given by:

$$\theta 1 = \theta \times l2/(l1+l2). \quad (1)$$

And the angle $\theta 2$ formed by the line segment L and the integrated partition line candidate Li is given by:

$$\theta 2 = \theta \times l1/(l1+l2). \quad (2)$$

That is, when the ratio between $l1$ and $l2$ is 2:1, $\theta 1$ is given by $\theta \times (1/3)$ and hence the integrated partition line candidate Li is inclined so as to be closer to the side of the partition line candidate Lc1 than the side of the partition line candidate Lc2.

As described above, the generation unit 232 generates the integrated partition line candidate Li so that it is longer than the partition line candidates Lc to be integrated together and extends in the direction that is determined according to the ratio between the reciprocals of the lengths of partition line candidates Lc to be integrated together. In this manner, the direction of the integrated partition line candidate Li can be set properly.

Next, a description will be made of priority order according to which the generation unit 232 generates an integrated partition line candidate Li. First, the generation unit 232 judges whether observation partition line candidates detected by the detection unit 231 satisfy the above-mentioned integration conditions and then generates an integrated partition line candidate Li. That is, the generation unit 232 generates an integrated partition line candidate Li using partition line candidates Lc in the current frame.

In doing so, the generation unit 232 judges whether the above integration conditions are satisfied in order starting from the longest partition line candidate Lc. This makes it possible to integrate partition line candidates Lc with priority given to longer partition line candidate Lcs over shorter partition line candidates Lc.

In other words, it is possible to make relatively shorter partition line candidates Lc be less reflected in an integrated partition line candidate Li. That is, integrating longer partition line candidates Lc preferentially makes it possible to generate a more reliable integrated partition line candidate Li.

When having generated a new integrated partition line candidate Li, the generation unit 232 judges in order whether the generated integrated partition line candidate Li and another observation partition line candidate satisfy the integration conditions. Upon thereafter completing processing of integrating observation partition line candidates, the generation unit 232 judges whether the observation partition line candidates plus a time-series partition line candidate satisfy the integration conditions and generates an integrated partition line candidate Li.

That is, the generation unit 232 generates an integrated partition line candidate Li using not only partition line candidates Lc in the current frame but also partition line candidates Lc in past frames. First, the generation unit 232 judges whether observation partition line candidates that did not satisfy integration conditions come to satisfy the integration conditions if a time-series partition line candidate is involved.

Figure 8:
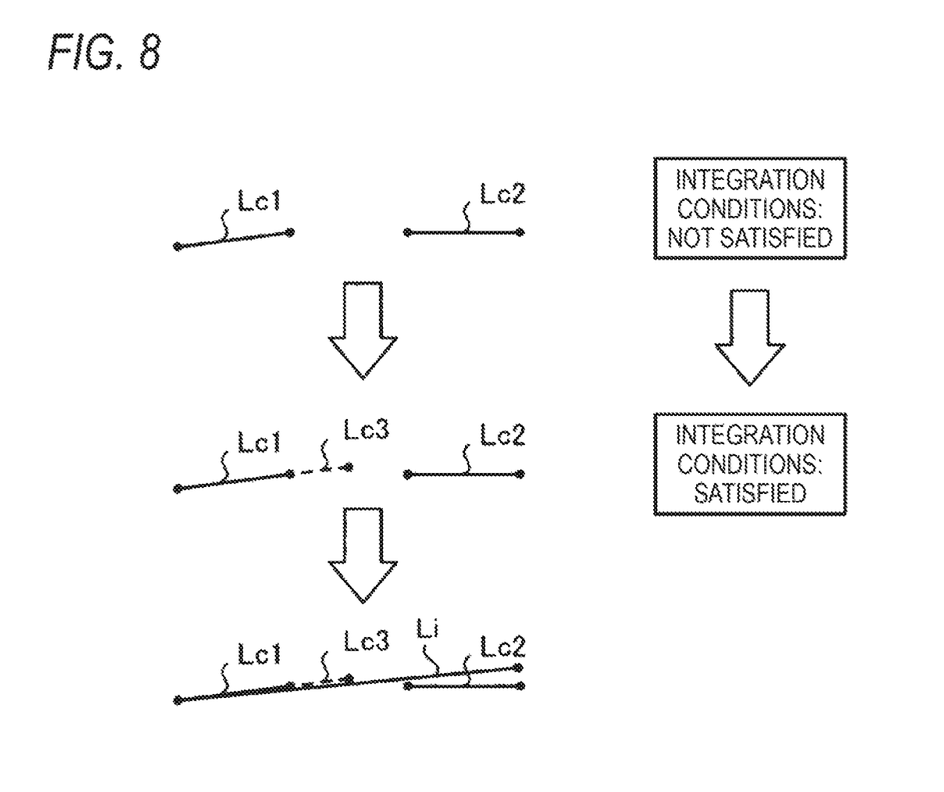
FIG. 8 shows another specific example integrated partition line candidate.

FIG. 8 shows another specific example integrated partition line candidate Li. It is now assumed that partition line candidates Lc1 and Lc2 are observation partition line candidates and a partition line candidate Lc3 is a time-series partition line candidate.

As shown in FIG. 8, it is assumed that the partition line candidates Lc1 and Lc2 exist that do not satisfy the integration conditions. The generation unit 232 judges whether the integration conditions come to be satisfied if the partition line candidate Lc3 which is a time-series partition line candidate is added to the partition line candidates Lc1 and Lc2.

The example of FIG. 8 is such that the partition line candidates Lc1 and Lc3 exist on the same straight line and the partition line candidate Lc1 is elongated imaginarily. The generation unit 232 regards the partition line candidates Lc1 and Lc3 as a single partition line candidate Lc and judges whether it and the partition line candidate Lc2 satisfy the integration conditions.

If judging that the integration conditions are satisfied, the generation unit 232 generates an integrated partition line candidate Li using the partition line candidates Lc1 and Lc2. That is, the generation unit 232 uses the time-series partition line candidate in judging whether the integration conditions are satisfied, without reflecting it in the actual integrated partition line candidate Li.

As described above, where an observation partition line candidate comes to satisfy the integration conditions if it is extrapolated using a time-series partition line candidate, the generation unit 232 generates an integrated partition line candidate Li using the observation partition line candidate. In other words, using a time-series partition line candidate in auxiliary manner makes it possible to integrate more observation partition line candidates When having finished the entire processing of integrating observation partition line candidates using a time-series partition line candidate, the generation unit 232 judges whether the observation partition line candidates satisfy the integration conditions for the time-series partition line candidates and generates integrated partition line candidates Li.

That is, the generation unit 232 updates the time-series partition line candidates on the basis of the observation partition line candidates. This makes it possible to update the time-series partition line candidate properly. If another observation partition line candidate satisfies the integration conditions for a newly generated integrated partition line candidate Li, the generation unit 232 generates an integrated partition line candidate Li using both partition line candidates Lc.

In other words, the generation unit 232 performs the above processing repeatedly until disappearance of an observation partition line candidate that satisfies the integration conditions for the time-series partition line candidates. If, for example, plural observation partition line candidates that satisfy the integration conditions exist for one time-series partition line candidate, the generation unit 232 generates an integrated partition line candidate Li using a certain observation partition line candidate according to priority conditions. An example of such priority conditions will be described later with reference to FIG. 9.

Then the generation unit 232 judges whether a time-series partition line candidate exists that satisfy the integration conditions for the observation partition line candidates, and generates an integrated partition line candidate Li. The update state of the thus-generated integrated partition line candidate Li is made the observation updated state st2.

Then the generation unit 232 judges whether time-series partition line candidates satisfy the integration conditions and generates an integrated partition line candidate Li. When an integrated partition line candidate Li is generated from time-series partition line candidates, its update state is also made the observation updated state st2.

Figure 9:
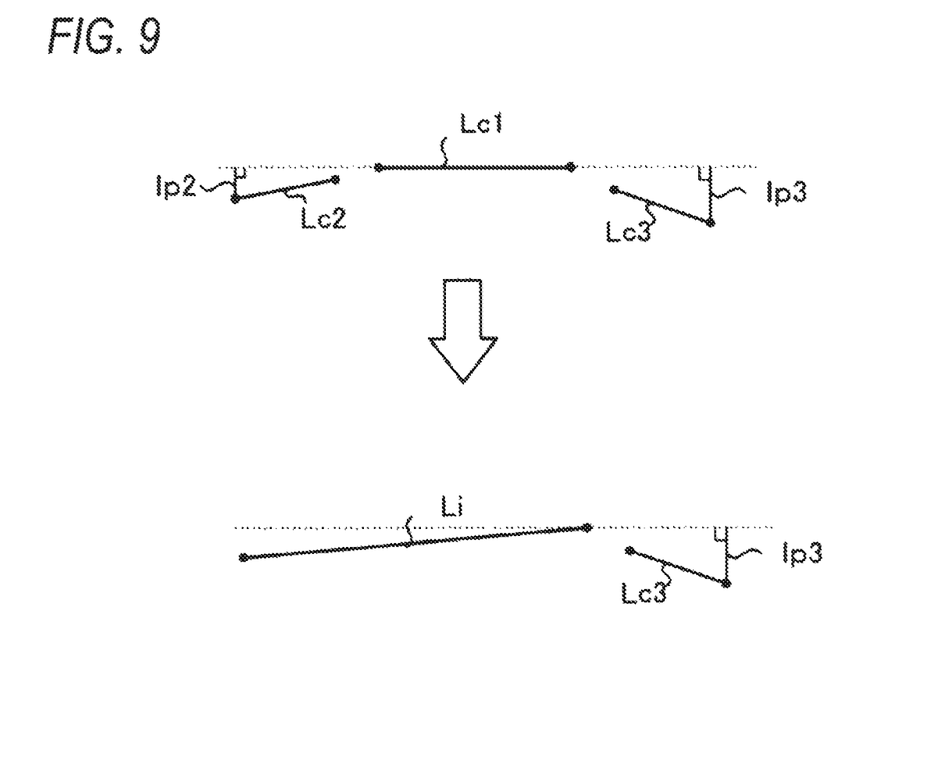
FIG. 9 shows an example priority condition.

Next, priority conditions mentioned above will be described with reference to FIG. 9. FIG. 9 shows an example priority condition. A case that partition line candidates Lc2 and Lc3 satisfy the integration conditions for an integrated partition line candidate Li1 shown in FIG. 9.

In this case, as shown in FIG. 9, the partition line candidate Le1 is integrated with a partition line candidate Lc having a shorter perpendicular when perpendiculars lp2 and lp3 are drawn from the partition line candidates Lc2 and Lc3 to extensions of the partition line candidate Lc1, respectively.

In the example shown in FIG. 9, the perpendicular lp2 of the partition line candidate Lc2 is shorter than the perpendicular lp3 of the partition line candidate Lc3. Thus, the generation unit 232 generates an integrated partition line candidate Li by integrating the partition line candidates Le1 and Lc2 together.

Subsequently, if the integrated partition line candidate Li and the partition line candidate Lc3 satisfy the integration conditions, the generation unit 232 generates a new integrated partition line candidate Li using the current integrated partition line candidate Li and the partition line candidate Lc3.

As described above, the generation unit 232 can generate a proper integrated partition line candidate Li by generating an integrated partition line candidate Li using a partition line candidate Lc having a high priority rank. The above-described priority order is just an example. The priority condition used may be changed as appropriate; for example, priority may be given to a partition line candidate Lc that is closer to the partition line candidate Le1 in distance or angle.

Figure 10:
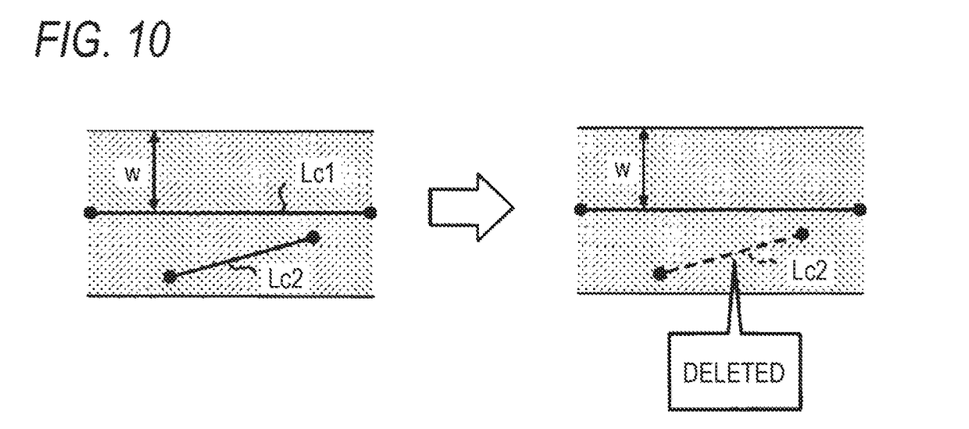
FIG. 10 shows a specific example deletion condition.

Returning to FIG. 3, the deletion unit 233 will be described. The deletion unit 233 deletes an unnecessary partition line candidate Lc according to prescribed deletion conditions. FIG. 10 shows a specific example deletion condition. As shown in FIG. 10, if a partition line candidate Lc2 exists whose start point and end point exist in a prescribed range bounded by lines that are spaced from a partition line candidate Lc1 by a distance w in the width direction, the deletion unit 233 deletes it.

That is, if a partition line candidate Lc that is shorter than any partition line candidate Lc exists in the vicinity of the latter, the deletion unit 233 deletes it. In other words, if there exists, in the vicinity of a relatively long partition line candidate Lc, a short partition line candidate Lc that does not satisfy the integration conditions, the deletion unit 233 deletes the short partition line candidate Lc.

This measure makes it possible to eliminate noise that is caused by a roughness or the like of a road surface portion that is located in the vicinity of a partition line candidate Lc. The accuracy of detection of partition lines can be increased in this manner because only highly reliable partition line candidates Lc can be left. The processing load of downstream stages can be reduced by an amount corresponding to the deletion of unnecessary partition line candidates Lc.

The update state of each observation partition line candidate that has not been deleted by the deletion unit 233 is made the new state st1.

Returning to FIG. 3, the updating unit 234 will be described. The updating unit 234 updates the update state (see FIG. 4) of each partition line candidate Lc. More specifically, as described above, the updating unit 234 registers an observation partition line candidate that has not been deleted by the deletion unit 233 in the partition line information 31 as one in the new state st1.

The updating unit 234 updates, to the observation updated state st2, the update state of a time-series partition line candidate that has been updated using an observation partition line candidate. The updating unit 234 updates, to the prediction updated state st3, the update state of a partition line candidate Lc that is in the neither new state st1 nor the observation updated state st2.

It is also possible for the updating unit 234 to updates the position, relative to the vehicle C, of a partition line candidate Lc in the prediction updated state st3 on the basis of a movement distance of the vehicle C. The updating unit 234 updates the update state of a partition line candidate Lc to the deletion candidate state st4 if its update state has continued to be the prediction updated state st3 a prescribed number of times after its update state was made the prediction updated state st3.

The updating unit 234 can manage each partition line candidate Lc properly by updating its update state in the above manner. If a partition line candidate Lc goes out of the shooting range R of the vehicular camera 10 as the vehicle C moves, the updating unit 234 holds its update state to the one before it goes out of the shooting range R.

If the partition line candidate Lc returns to the shooting range R as a result of movement of the vehicle C, the updating unit 234 restarts the updating of the update state of this partition line candidate Lc. In this manner, the partition line candidate Lc can be managed continuously.

It is also possible for the updating unit 234 to update partition line candidates Lc in the prediction updated state st3 as the vehicle C moves. This makes it possible to keep the continuity of partition line candidates Lc properly.

Figure 11:
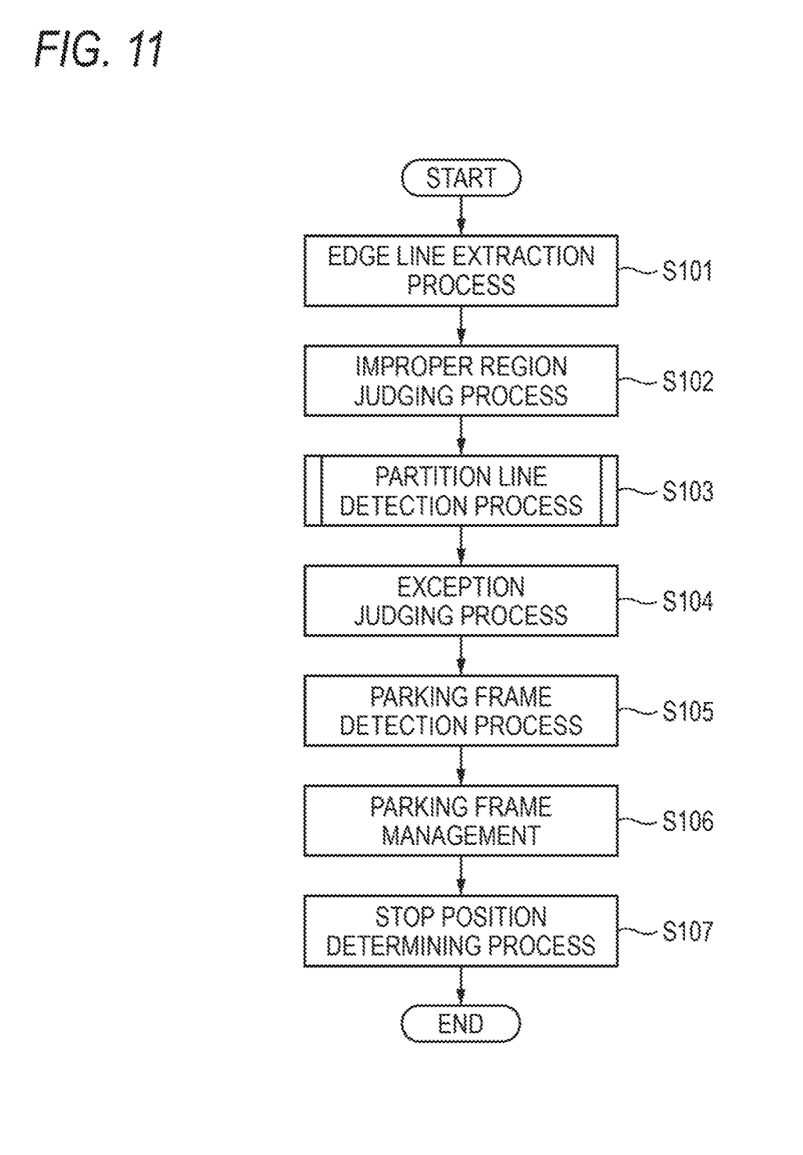
FIG. 11 is a flowchart showing the procedure of a process that is executed by the image processing device according to the embodiment.

Next, the procedure of a process that is executed by the image processing device 1 according to the embodiment will be described with reference to FIG. 11. FIG. 11 is a flowchart showing the procedure of a process that is executed by the image processing device 1. For example, this process is executed by the control unit 2 repeatedly while the vehicle speed of the vehicle C is lower than or equal to a prescribed value (e.g., 30 km/h).

As shown in FIG. 11, first, at step S101, the image processing device 1 executes an edge line extraction process of extracting edge points and edge lines from a grayscale image. At step S102, the image processing device 1 executes an improper region judging process on the basis of processing results of the edge line extraction process.

At step S103, the image processing device 1 executes a partition line detection process of detecting partition line candidates on the basis of the edge lines extracted at step S101. The procedure of the partition line detection process will be described later with reference to FIG. 12.

At step S104, the image processing device 1 executes an exception judging process of judging presence/absence of a parking prohibition region or the like on the basis of the processing results of steps S101-S103. At step S105, the image processing device 1 executes a parking frame detection process of detecting a parking frame.

At step S106, the image processing device 1 performs parking frame management of managing the parking frame detected at step S105. At step S107, the image processing device 1 executes a stop position determining process of determining a stop position, where to stop the vehicle C, in the parking frame. Then the image processing device 1 finishes the execution of the process shown in FIG. 11.

Figure 12:
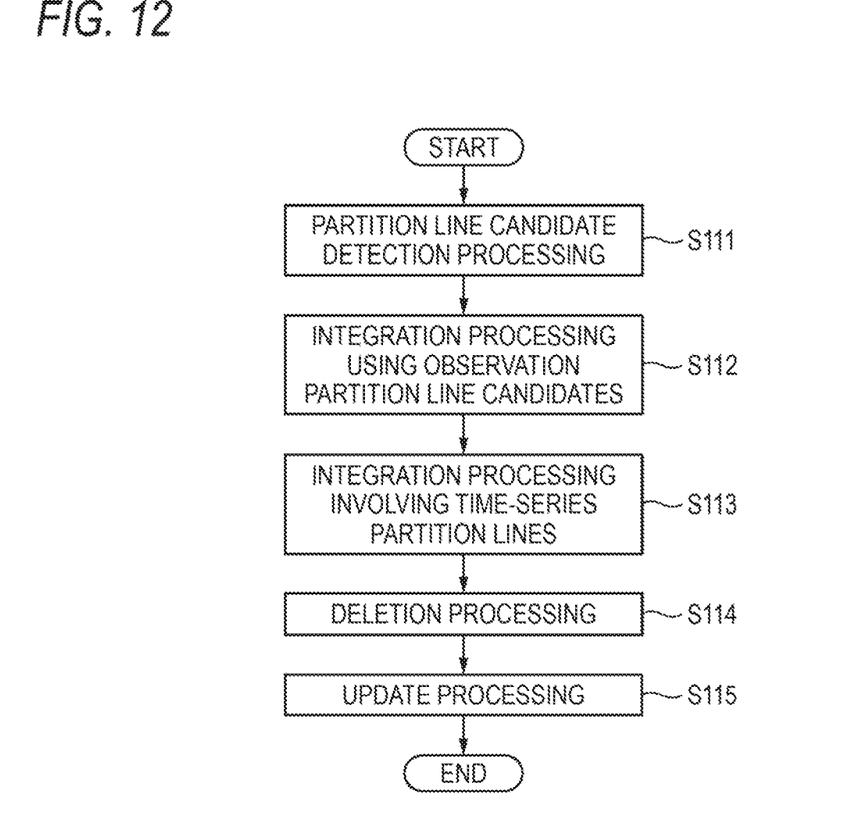
FIG. 12 is a flowchart showing the procedure of a partition line detection process shown in FIG. 11.

Next, the procedure of the partition line detection process (step S103) shown in FIG. 11 will be described with reference to FIG. 12. FIG. 12 is a flowchart showing the procedure of the partition line detection process shown in FIG. 11. This process is executed by the partition line detection unit 23.

As shown in FIG. 12, at step S111, the partition line detection unit 23 performs processing of detecting partition line candidates Lc on the basis of the edge lines extracted by the line segment extraction unit 21. At step S112, the partition line detection unit 23 performs integration processing using observation partition line candidates on the basis of the partition line candidates Lc detected at step S111.

At step S113, the partition line detection unit 23 performs integration processing using not only the observation partition line candidates but also time-series partition line candidates. In the integration processing of step S113, first, if integrated partition line candidates come to satisfy the integration conditions if they are extrapolated using a time-series partition line candidate, the partition line detection unit 23 generates an integrated partition line candidate Li using these integrated partition line candidates.

Subsequently, if a time-series partition line candidate and an observation partition line candidate satisfy the integration conditions, the partition line detection unit 23 generates an integrated partition line candidate using the time-series partition line candidate and the observation partition line candidate. Then, at step S114, the partition line detection unit 23 performs deletion processing of deleting unnecessary observation partition line candidates and time-series partition line candidates.

At step S115, the partition line detection unit 23 updates the partition line information 31, whereupon the process is finished.

As described above, the partition line detection unit 23 of the image processing device 1 according to the embodiment is equipped with the detection unit 231 and the generation unit 232. The detection unity 231 detects partition line candidates, that is, candidates for partition lines for partitioning a parking frame, on the basis of edge lines detected on the basis of the luminance of each pixel of image data I taken by shooting a neighborhood of the vehicle C.

The generation unit 232 generates an integrated partition line candidate by integrating partition line candidates detected by the detection unity 231 according to the prescribed integration conditions. As such, the image processing device 1 according to the embodiment can increase the accuracy of detection of a parking frame.

Incidentally, the above embodiment is directed to the case that the image processing device 1 acquires pieces of information relating to a running state of the vehicle C from the sensor group Sc (see FIG. 2); however, the invention is not limited to that case. The image processing device 1 may extract optical flow from image data I and estimate a running state of the vehicle C on the basis of the optical flow.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: Image processing device
21: Line segment extraction unit
22: Improper region judging unit
23: Partition line detection unit
24: Exception judging unit
25: Parking frame detection unit
26: Parking frame managing unit
27: Stop position determining unit
31: Partition line information
32: Integration condition information
231: Detection unit
232: Generation unit
233: Deletion unit
234: Updating unit
Lc: Partition line candidate
Li: Integrated partition line candidate

What is claimed is:

1. An image processing device comprising:
a processor and associated memory configured to:
detect partition line candidates that are candidates for a partition line for partitioning a parking frame, based on edge lines that are detected based on luminance of each pixel of image data taken by shooting a neighborhood of a vehicle;
generate an integrated partition line candidate by integrating the detected partition line candidates, according to a prescribed integration condition; and
employ, as a length of the integrated partition line candidate, a length of a line segment that is longer between line segments each of which connects a start point of one of two partition line candidates to be integrated together and an end point of other of the two partition line candidates.

2. The image processing device according to claim 1, wherein the processor employs, as an angle of the integrated partition line candidate, an angle obtained by dividing an angle formed by the longer line segment and a longer one of the two partition line candidates according to a ratio between reciprocals of lengths of the two partition line candidates.

3. The image processing device according to claim 2, wherein the processor judges whether the integration condition is satisfied in order from the longer partition line candidate.

4. The image processing device according to claim 2, wherein the processor generates the integrated partition line candidate by combining the partition line candidate or the integrated partition line candidate in a current frame and the partition line candidate or the integrated partition line candidate in a past frame.

5. The image processing device according to claim 4, wherein, in a case where a pair of the partition line candidates or the integrated partition line candidates in the current frame satisfy the integration condition by extrapolating one of the pair of the partition line candidates or the integrated partition line candidates in the current frame using the partition line candidate or the integrated partition line candidate in the past frame, the processor generates the integrated partition line candidate by integrating the pair of the partition line candidates or the integrated partition line candidates.

6. The image processing device according to claim 2, wherein the processor is further configured to delete the partition line candidate or the integrated partition line candidate that satisfies a prescribed deletion condition.

7. The image processing device according to claim 1, wherein the processor judges whether the integration condition is satisfied in order from the longer partition line candidate.

8. The image processing device according to claim 1, wherein the processor generates the integrated partition line candidate by combining the partition line candidate or the integrated partition line candidate in a current frame and the partition line candidate or the integrated partition line candidate in a past frame.

9. The image processing device according to claim 8, wherein, in a case where a pair of the partition line candidates or the integrated partition line candidates in the current frame satisfy the integration condition by extrapolating one of the pair of the partition line candidates or the integrated partition line candidates in the current frame using the partition line candidate or the integrated partition line candidate in the past frame, the processor generates the integrated partition line candidate by integrating the pair of the partition line candidates or the integrated partition line candidates.

10. The image processing device according to claim 9, wherein the processor is further configured to update the partition line candidates and the integrated partition line candidates in the current frame based on the partition line candidates or the integrated partition line candidates in the past frame.

11. The image processing device according to claim 8, wherein the processor is further configured to update the partition line candidates and the integrated partition line candidates in the current frame based on the partition line candidates or the integrated partition line candidates in the past frame.

12. The image processing device according to claim 1, wherein the processor is further configured to delete the partition line candidate or the integrated partition line candidate that satisfies a prescribed deletion condition.

13. An image processing method comprising:
detecting partition line candidates that are candidates for a partition line for partitioning a parking frame, based on edge lines that are detected based on luminance of each pixel of image data taken by shooting a neighborhood of a vehicle;
generating an integrated partition line candidate by integrating the detected partition line candidates, according to a prescribed integration condition; and
employing, as a length of the integrated partition line candidate, a length of a line segment that is longer between line segments each of which connects a start point of one of two partition line candidates to be integrated together and an end point of other of the two partition line candidates.

* * * * *